United States Patent
Anderson et al.

(10) Patent No.: US 9,588,374 B2
(45) Date of Patent: Mar. 7, 2017

(54) REFLECTIVE LC DEVICES INCLUDING THIN FILM METAL GRATING

(71) Applicant: JDS Uniphase Corporation, Milpitas, CA (US)

(72) Inventors: Keith Anderson, Ottawa (CA); John Michael Miller, Gatineau (CA); Hery Djie, San Jose, CA (US); Lu Tian, Palo Alto, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/625,863

(22) Filed: Feb. 19, 2015

(65) Prior Publication Data

US 2015/0234221 A1 Aug. 20, 2015

Related U.S. Application Data

(60) Provisional application No. 61/941,528, filed on Feb. 19, 2014.

(51) Int. Cl.
*G02F 1/13363* (2006.01)
*G02F 1/1335* (2006.01)
(Continued)

(52) U.S. Cl.
CPC .... *G02F 1/13363* (2013.01); *G02F 1/133553* (2013.01); *G02F 1/134309* (2013.01);
(Continued)

(58) Field of Classification Search
CPC ........... G02F 1/03363; G02F 1/033553; G02F 1/133345; G02F 2001/133638;
(Continued)

(56) References Cited

U.S. PATENT DOCUMENTS 8,325,305 B2 * 12/2012 You .................... G02F 1/134309
349/129
8,440,775 B2 * 5/2013 Harimoto ............... C08G 77/12
528/31

(Continued)

FOREIGN PATENT DOCUMENTS

EP 1420275 5/2004 ............... G02B 5/30
EP 1780582 5/2007 ............... G02F 1/13
WO WO 2013/117903 8/2013

OTHER PUBLICATIONS

G. D. Love, "Liquid-Crystal Phase modulator for unpolarized light", Appl. Opt., vol. 32, No. 13, pp. 2222-2223, May 1, 1993.
(Continued)

*Primary Examiner* — Paisley L Arendt
*Assistant Examiner* — Angela Davison
(74) *Attorney, Agent, or Firm* — Harrity & Harrity, LLP

(57) ABSTRACT

A sub-wavelength thin-film metal grating is placed inside a liquid crystal variable optical retarder at a selected distance from a reflective electrode to form a reflective half wave plate, thereby reducing polarization dependence of the optical retardation generated by the variable optical retarder. The approach enables to form within the device the reflective half wave plate that is suitably thin without modifying the reflective electrode of the device.

12 Claims, 9 Drawing Sheets

(51) Int. Cl.
*G02B 5/30* (2006.01)
*G02B 5/18* (2006.01)
*G02F 1/1343* (2006.01)

(52) U.S. Cl.
CPC .............. *G02B 5/18* (2013.01); *G02B 5/3058* (2013.01); *G02F 2001/133567* (2013.01); *G02F 2001/133638* (2013.01); *G02F 2201/305* (2013.01); *G02F 2201/307* (2013.01)

(58) Field of Classification Search
CPC ........... G02F 2201/123; G02F 2201/30; G02F 2201/307; G02F 2201/133357; G02F 1/133553; G02F 1/133548; G02F 1/133555; G02F 2201/305; G02F 2201/34; G02F 2203/02; G02F 2203/09; C09D 183/04; C08L 63/00; C08L 2666/44; C08L 2666/58; Y10T 428/1068; Y10T 428/1045; G02B 5/3058; G02B 5/18; G02B 5/1809; G02B 5/1833; G02B 5/1861; G02B 5/1866
USPC ......... 349/113, 114, 193, 201, 202, 18, 138, 349/139, 96; 359/279, 566; 428/1.32, 428/1.52
See application file for complete search history.

(56) References Cited

U.S. PATENT DOCUMENTS

| 2005/0078237 A1 | 4/2005 | Klaus et al. ................... 349/98 |
| 2006/0256263 A1 | 11/2006 | Shimizu et al. |
| 2007/0070276 A1 | 3/2007 | Tan et al. ...................... 349/117 |
| 2008/0043187 A1 | 2/2008 | Mimura ........................ 349/114 |
| 2008/0218862 A1 | 9/2008 | Kekas |
| 2013/0070326 A1* | 3/2013 | Frisken ............... H04L 27/2096 359/279 |
| 2016/0291405 A1 | 10/2016 | Frisken et al. |

OTHER PUBLICATIONS

James et. al., "Modeling of the diffraction efficiency and polarization sensitivity for a liquid crystal 2D spatial light modulator for reconfigurable beam steering", J. Opt. Soc. Am. A, vol. 24, No. 8, pp. 2464-2473, Aug. 8, 2007.

Moore et. al., "The Silicon Backplane Design for an LCOS Polarization-Insensitive Phase Hologram SLM", IEEE Phot. Tech. Left. vol. 20, No. 1, pp. 60-62, Jan. 1, 2008.

Kelly et al., "White-light performance of a polarization-independent liquid-crystal phase modulator", Appl. Opt. vol. 38, No. 10, pp. 1986-1989, Apr. 1, 1999.

Kok et al., "Relative phases of electromagnetic waves diffracted by a perfectly conducting rectangular-grooved grating", J. Opt. Soc. Am. A, vol. 5 No. 1., pp. 65-73, Jan. 1988.

Ahderom et. al. "Dynamic WDM Equalizer Using Opto-VLSI Beam Processing", IEEE Photon. Tech. Lett. vol. 15, No. 11, pp. 1603-1605, Nov. 2003.

M. Kuittinen et al, "Subwavelength-structured elements", p. 314, in Turunen and Wyrowski (editors), "Diffractive Optics for Industrial and Commercial Applications" Ch. 11 p. 314, 1st Edition, 1997.

Pang et al., "Metal nano-grid reflective wave plate", Opt. Soc. Am., Optics Express, Vo. 17, No. 4, pp. 2871-2879, Feb. 16, 2009.

Ribaudo et al., "High efficiency reflective waveplates in the midwave infrared", Op. Soc. Am., Optics Express, vol. 22, No. 3, pp. 2821-2829, Feb. 10, 2014.

International Search Report and Written Opinion mailed Mar. 5, 2015 for PCT Application No. PCT/US2014/065526, 11 pages.

* cited by examiner

REFLECTIVE LC DEVICES INCLUDING THIN FILM METAL GRATING

CROSS-REFERENCE TO RELATED APPLICATIONS

The present invention claims priority from U.S. Provisional Patent Application No. 61/941,528 filed Feb. 19, 2014, which is incorporated herein by reference.

TECHNICAL FIELD

The present disclosure relates to liquid crystal devices, and in particular relates to reflective liquid crystal based optical modulators and variable retarders incorporating form birefringent waveplate, and methods of their fabrication.

BACKGROUND

Optical device incorporating liquid crystals are well known in the art and are used in a variety of applications, including optical phase modulators and variable optical retarders, which are used to impart a variable optical phase delay and/or change the state of polarization of an optical beam. Reflective LC devices may be conveniently fabricated using developed liquid-crystal-on-silicon (LCoS) technology. In a typical LCoS device, a few micrometers (µm) thick layer of an LC fluid is sandwiched between a transparent electrode and a reflective electrode, with the latter formed upon a silicon substrate that also incorporates electrical circuitry required to drive the device. When a voltage is applied to the electrodes, an electric field between the electrodes affects the orientation of LC molecules, which are highly anisotropic. Field-induced orientation of the LC molecules changes an effective index of refraction of the LC layer for an incident optical beam, which affects an optical phase of the optical beam propagating through the LC layer in a way that depends on the polarization of light. When the optical beam incident upon the transparent electrode is linearly polarized either along a predominant direction of orientation of the LC molecules, which is referred to as "director", or perpendicularly thereto, a variable optical phase delay is imparted to the optical beam by the LC layer of the device without changing the beam polarization, with the value of the phase shift being different for the two orthogonal polarizations. When the incident optical beam is linearly polarized at an acute angle to the LC director, the LC layer can change the polarization state of the optical beam; for example, it can rotate the linear optical polarization, by inducing an optical phase difference between polarization components of the optical beam that are directed along and perpendicular to the LC director.

Arrays of variable optical retarders or phase modulators can be constructed by arranging an array of individually controllable pixel electrodes under a common liquid crystal layer. When a linearly polarized optical beam illuminates such an array, pre-determined optical phase patterns can be imparted to the beam, allowing variable focusing or steering of the optical beam without any moving parts. Arrays of variable optical retarders have found a variety of applications in beam scanning/steering, optical aberrations correction, and so on.

The sensitivity of the LC variable retarders and optical phase modulators to the polarization of the optical beam may be a disadvantage in applications wherein the polarization state of the incident light is not carefully controlled. This sensitivity may be overcome or lessened by incorporating a quarter wave plate between the two electrodes. A quarter wave plate at the reflective electrode of a reflective LC device operates in double-pass as a half wave plate, and switches the polarization state of the light to an orthogonal polarization half-way in its round-trip through the LC layer. In such an arrangement, light that is linearly polarized either along the LC director or orthogonally thereto travels through the LC layer once in its original polarization state, and once in an orthogonal polarization state, resulting at least in theory in a polarization-independent operation.

One drawback of this solution is that the addition of a wave plate between electrodes of an LC device increases the distance between the electrodes, and therefore increases the operating voltage of the device. For example, a typical quartz quarter-wave plate is considerably thicker than a typical LC layer, thus its addition would more than double the required operating voltage. Furthermore, it would be difficult to incorporate such a waveplate into an LCoS device. Form-birefringent (FM) sub-wavelength gratings with a high refractive index contrast may represent a better alternative to conventional waveplates for LC devices. For example, a quarter wave plate for operating at $\lambda=1.55$ µm may be realized with an air gaps based FB structure that is of the order of one micron thick. However, these structures may be difficult to fabricate commercially due to their fragility. Alternatively, reflection mode sub-wavelength metallic gratings with a square-wave or similar relief can be employed as waveplates. Although they require a shallower relief depth than FB gratings based on alternating dielectrics, implementing them on the surface of LCOS pixel electrodes may considerably complicate the LCoS fabrication process and reduce device yield.

Accordingly, it may be understood that there may be significant problems and shortcomings associated with current solutions and technologies related to lessening polarization sensitivity of reflective LC devices and to optical wave plates that may be incorporated in such devices.

SUMMARY

It is an objective of the present disclosure to provide an improved or an alternative reflective LC device, such as a variable optical retarder or optical phase modulator, incorporating a form birefringent structure.

In accordance with the present disclosure, a sub-wavelength metal grating with grating lines in the form of parallel, spaced apart metal strips is placed inside a liquid crystal device, such as a variable optical retarder, between a flat reflective electrode and a liquid crystal (LC) layer, with an optically transparent non-conducting separation layer of a selected small thickness separating the reflective electrode and the metal grating. The sub-wavelength metal grating in cooperation with the reflective electrode act in reflection as a thin half-wave plate, which may lessen the polarization sensitivity of the LC device without the need to modify the reflective electrode. The metal strips forming the sub-wavelength metal grating may be strips of a thin metal film.

An aspect of the disclosure relates to an LC device comprising: a first electrode having a reflective top surface; a separation layer disposed over the reflective top surface of the first electrode, wherein the separation layer is substantially transparent at an operating wavelength of the LC device; a sub-wavelength metal grating disposed over the separation layer, the sub-wavelength metal grating comprised of a plurality of parallel metal strips spaced apart from each other and extending along the reflective top surface of the first electrode at a pre-determined distance therefrom defined by the separation layer, so as to form a reflective form-birefringent (FB) waveplate with the reflective top surface of the first electrode; an LC layer disposed over the sub-wavelength metal grating; and, a second electrode disposed over the LC layer in opposition to the first electrode, wherein the second electrode is transparent at the operating wavelength, so that the LC layer imparts a variable optical phase shift to light impinging on the second electrode when a voltage is applied between the first and second electrodes.

The present disclosure further provides a method for fabricating a variable optical retarder, comprising:

a) depositing a spacer layer of an optically transparent material over a reflective top face of a substrate, the substrate comprising a first electrode having a flat top surface, and an electrode passivation layer disposed over the flat top surface of the first electrode so as to form the reflective top face of the substrate;

b) forming a sub-wavelength metal grating over the spacer layer, the sub-wavelength metal grating comprising a plurality of parallel spaced apart metal strips, so that the sub-wavelength metal grating forms with the reflective top face of the substrate a reflective form-birefringent waveplate of a pre-determined retardance;

c) depositing a grating cap layer over the sub-wavelength metal grating;

d) disposing a liquid crystal (LC) layer having a director over the grating cap layer; and e) disposing a transparent second electrode over the LC layer in opposition to the first electrode, so that the LC layer imparts a variable optical phase shift to light impinging on the second electrode when a voltage is applied between the first and second electrodes.

In accordance with an aspect of the present disclosure, the thickness of the spacer layer may be selected so that a combined optical thickness of the spacer layer and the electrode passivation layer provides a substantially half wave plate double-pass retardance for the light impinging upon the sub-wavelength metal grating from the second electrode.

BRIEF DESCRIPTION OF THE DRAWINGS

Exemplary embodiments disclosed herein will be described in greater detail with reference to the accompanying drawings, in which like reference numerals indicate like elements, and wherein.

DETAILED DESCRIPTION

In the following description, for purposes of explanation and not limitation, specific details are set forth, such as particular optical and electrical components, assemblies, techniques, materials, etc. in order to provide a thorough understanding of the present invention. However, it will be apparent to one skilled in the art that the present invention may be practiced in other embodiments that depart from these specific details. In other instances, detailed descriptions of well-known methods, devices, components and circuits are omitted so as not to obscure the description. Note that as used herein, the terms "first", "second" and so forth are not intended to imply sequential ordering, but rather are intended to distinguish one element from another unless explicitly stated otherwise. The term 'transparent' or 'optically transparent' means substantially transparent for light at a target wavelength of operation. The term 'sub-wavelength', when used with a reference to a grating, means having a pitch or period that is smaller than the target wavelength of operation. The term 'grating' as used herein does not necessarily imply exact periodicity, and encompasses gratings wherein spacing of grating lines may vary across the grating; in such non-periodic or quasi-periodic gratings the term 'pitch' refers to an average distance between centers of the grating lines unless stated otherwise. While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
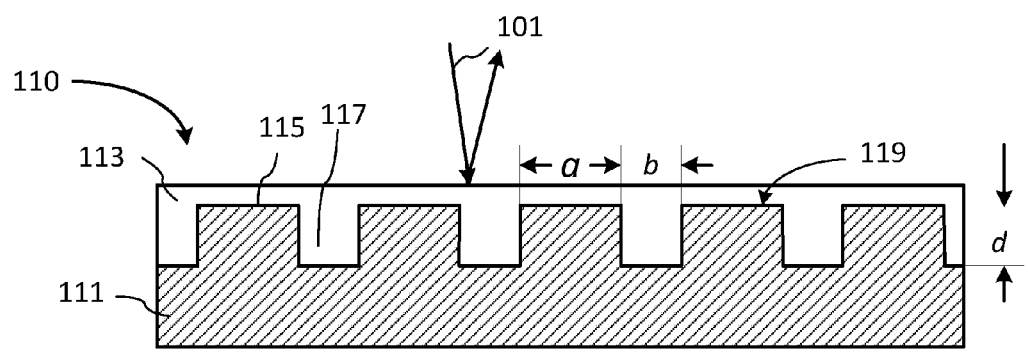
FIG. 1A is a schematic side view of a reflective form-birefringent (FB) waveplate utilizing a corrugated reflector.
Figure 1B:
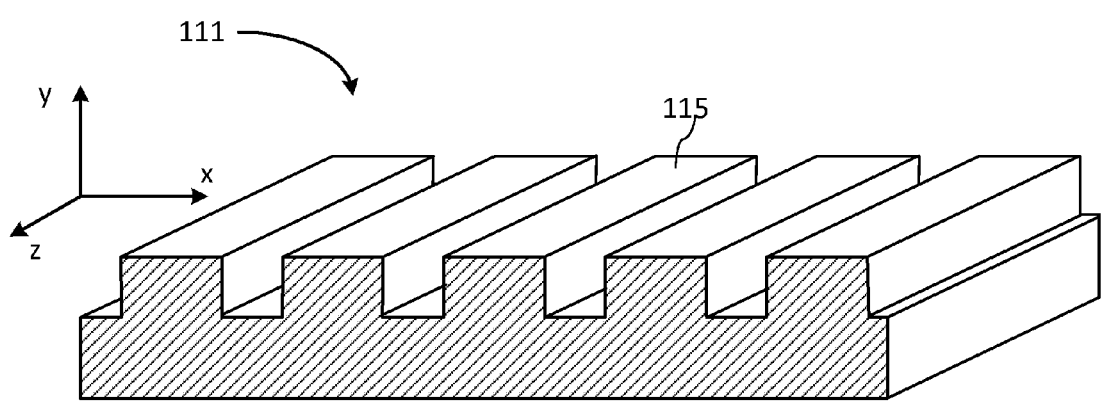
FIG. 1B is a schematic perspective view of the reflective FB waveplate of FIG. 1A.

With reference to FIG. 1A there is illustrated a reflective form birefringent (FB) waveplate (WP) 110 in a cross-sectional side view. The FB WP 110 is composed of a sub-wavelength reflective grating 111 and an optional transparent capping layer 113. The reflective grating 111, which is illustrated in FIG. 1B in perspective, is embodied as a metal layer, sheet or plate having a plurality of parallel straight ridges 115 formed on one face thereof. In FIG. 1B, these ridges are shown to extend along a 'z' coordinate of a Cartesian coordinate system (x,y,z). The ridges 115, with recesses 117 therebetween, form a periodically corrugated light-reflecting surface 119 with a period or pitch p that is less than an operating wavelength of the waveplate λ. The optional layer 113 of a transparent material, e.g. a dielectric, may be capping the metal grating 111, optionally filling the recesses 117.

In operation, an optical beam 101 that impinges upon the FB WP 110 is reflected back from the corrugated light-reflecting surface 119 of the sub-wavelength metal grating 111 with a phase delay that depends on the state of polarization of the impinging beam. Namely, light that is linearly polarized along the ridges 115, i.e. along the 'z' axis in FIG. 1B, will experience a different phase delay upon reflection from the grating 111 than light that is linearly polarized in a direction orthogonal to the ridges 115, i.e. along the 'x' axis in FIG. 1B. The polarization of light wherein the electrical field of the light is directed along the ridges 115, or generally along grating lines of a grating, is referred to herein as the TE (Transverse Electric) polarization, while the polarization of light wherein the electrical field is directed perpendicularly to the grating ridges 115, or generally perpendicular to grating lines of a grating, is referred to herein as the TM (Transverse Magnetic) polarization.

The difference in the phase delays in reflection between the TE and TM polarizations measured in units of length, or in wavelengths of the incident light, may be referred herein as the retardance of the waveplate. The value of the retardation of the FB WP 110 depends on the depth d of the ridges 115, the ratio a/b of their width a to the width b of the recesses 117, or the 'fill factor' a/p, and on the ratio p/λ, of the grating period or pitch p=(a+b) to the wavelength λ of the incident optical beam 101, which is preferably less than one. The retardance of the FB WP 110, when measured in units of wavelength, is typically about or somewhat less than 2dn/λ, where n is the refractive index of the capping layer 113.

One drawback of the FB WP 110 relates to difficulties, at least in some applications, of fabricating the corrugated relief of the metal surface 119 of the reflective grating 111. For example, implementing the corrugated relief 119 on the surface of a metal electrode of an LCoS based optical modulator or variable retarder, as described for example in U.S. Patent Application No. 2013/0070326 that is incorporated herein by reference, may require a significant complication of a conventional LCoS fabrication process.

Figure 2:
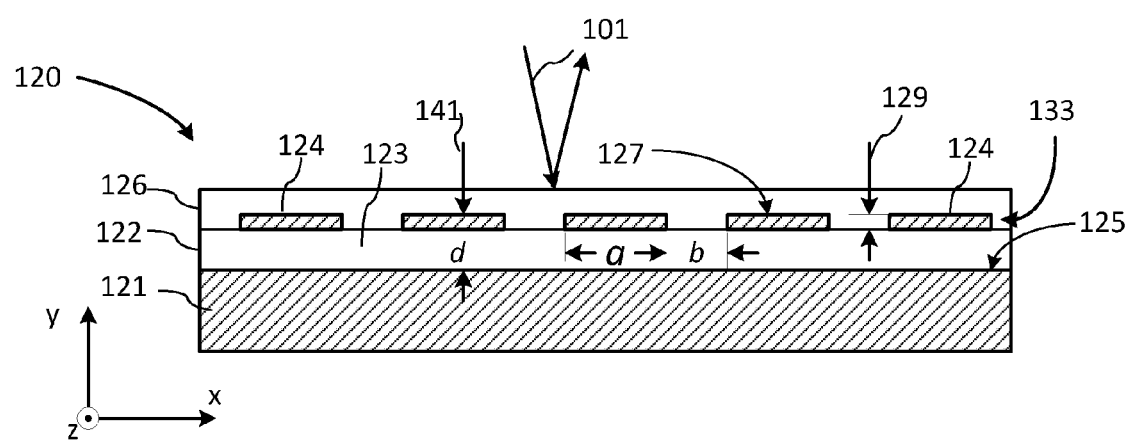
FIG. 2 is schematic side view cross-sectional of a reflective FB waveplate utilizing a sub-wavelength metal grating optically coupled to a flat reflector.

Referring now to FIG. 2, there is illustrated a side view of a reflective FB WP 120 according to an embodiment of the present disclosure. The WP 120 includes a substrate 121 having a reflective top face 125, and a separation layer 122 disposed over the reflective top face 125 of the substrate 121. In a preferred embodiment the reflective top face 125 of the substrate 121 is substantially flat, although it is not a necessary requirement. The separation layer 122 is formed of an optically transparent non-conducting material, i.e. a material that is substantially transparent at the operating wavelength λ of the waveplate; for example it may be formed of a suitable dielectric material such as silicon dioxide ($SiO_2$), silicon nitride (Si3N4) and the like. A sub-wavelength metal grating 133, which may be mostly transmissive for a first linear polarization and mostly reflective for a second linear polarization that is orthogonal to the first linear polarization, is disposed over the separation layer 122. The sub-wavelength metal grating 133 may be in the form of a metal grid, with parallel grating or grid lines 124 extending in a selected direction along the reflective top surface 125 of the substrate 121. An optional capping layer 126 may be further disposed over the reflective grating 133. In a preferred embodiment, the grating lines 124 of the metal grating 133 are in the form of a plurality of spaced apart, parallel metal strips that may be in the form of thin-film metal strips. Accordingly, the sub-wavelength metal grating 133 may also be referred to herein as the thin-film metal grating 133, and the metal strips 124 as the thin-film metal strips. The term 'thin-film', when used herein with reference to a grating or a part of a grating, means that the grating or its part is formed of a film or layer that is thinner than the separation layer that separates it from the underlying reflector. In typical embodiments the thickness t 129 of the thin-film metal strips 124 may be in the range of 0.1 to 0.02 μm. In one preferred embodiment, the metal strips 124 are substantially rectangular in cross-section. In other embodiments, the metal strips 124 may have cross-sections of a non-rectangular shape.

Reflective properties of the FB WP 120 may be understood by noting that incident light does not penetrate into a conducting metal sheet beyond a very thin top layer, and therefore the reflectance of a thin metal film quickly approaches the reflectance of a bulk metal as its thickness increases beyond that of that top layer, typically 10-20 nanometers (nm) and depending on the conductivity of the metal. By way of example, a 20 nm thin Aluminum (Al) film may have more than 90% reflectivity at λ~1.5 μm. Accordingly, at normal or nearly normal incidence when reflectance from the sides of the grating 'teeth' 115 of the FBWP 110 is insignificant, reflective properties of the FBWP 110 should remain approximately unchanged when all but the very top portion of the grating 'teeth' 115 are replaced by a dielectric, resulting in a structure of the type illustrated in FIG. 2. Therefore, reflective properties of the FB WP 120 should be similar to that of the FBWP 110 for the same values of the grating pitch p, fill-factor f=b/p, and the WP 'depth' d, as long as the thickness t of the metal strips 124 sufficiently exceeds an effective penetration depth of the incident light into the metal of the strips, 10-20 nm typically. The TE polarization may be more efficiently reflected by the metal grating 133 than the TM polarization, which may be mostly transmitted through the openings between the metal strips 124 and reflected from the underlying the reflective top face 125 of the substrate 121.

Accordingly, TE polarized light of an incident optical beam 101 that is linearly polarized along the strips 124, i.e. perpendicular to the plane of FIG. 2, will experience a different, typically smaller, phase delay upon reflection from the FB WP 120 than TM polarized light that is linearly polarized in a direction orthogonal to the strips 124, i.e. along the 'x' axis in FIG. 2, resulting in a non-zero retardance of the reflective FB WP 120. The value N of this retardance depends on the distance between the light reflecting surfaces of the strips 124 and the substrate 121, which is also referred to herein as the WP depth, including on the thickness d and the refractive index n of the separation layer. It depends also on the dielectric 'fill factor' b/p, where b is the width of the openings between adjacent grating lines 124 and p=(a+b) is the pitch of the grating, and may also depend on the ratio p/λ of the grating pitch to the wavelength λ of the incident optical beam 101, and on the thickness t 129 of the strips 124 and the refractive index of the cap layer 126 between the strips 124. For t<<d, the retardance of the reflective FB WP 120, when measured in units of length, may be estimated to be about twice the optical thickness 2d·n of the separation layer 122, where n is the refractive index of the separation layer 122. Accordingly, for a given target value N of the waveplate retardance, the optical thickness n·d of the separation layer 122 may be selected to be about N/2, depending on the dielectric fill factor f.

Advantageously, a FB WP of the type illustrated in FIG. 2 can be added to, or formed in, any device or structure having a planar mirror-like reflective surface, including a planar mirror surface of a passivated metal, i.e. having a cap layer of optically transparent material covering the surface of the metal. Since the separation layer 122 effectively separates the metal grating 133 from the planar mirror surface 125 of the underlying substrate or wafer, the latter does not need to be changed, and the fabrication of the reflective FB WP may be performed at a different site or facility than the fabrication of the underlying structure having the flat mirror surface, and/or at a later time.

Figure 3:
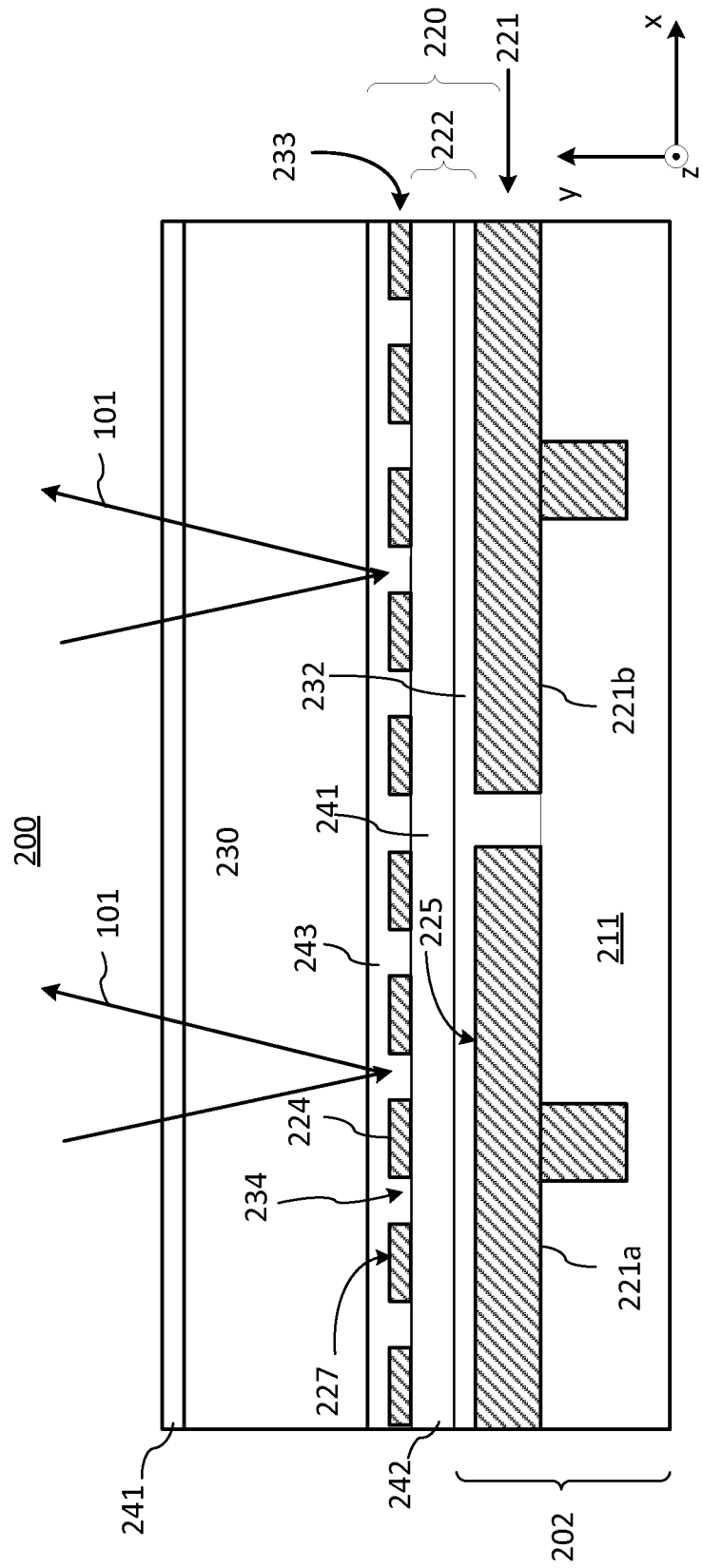
FIG. 3 is a side cross-sectional view of a liquid crystal (LC) device incorporating a reflective FB waveplate formed with a sub-wavelength metal grating.
Figure 4:
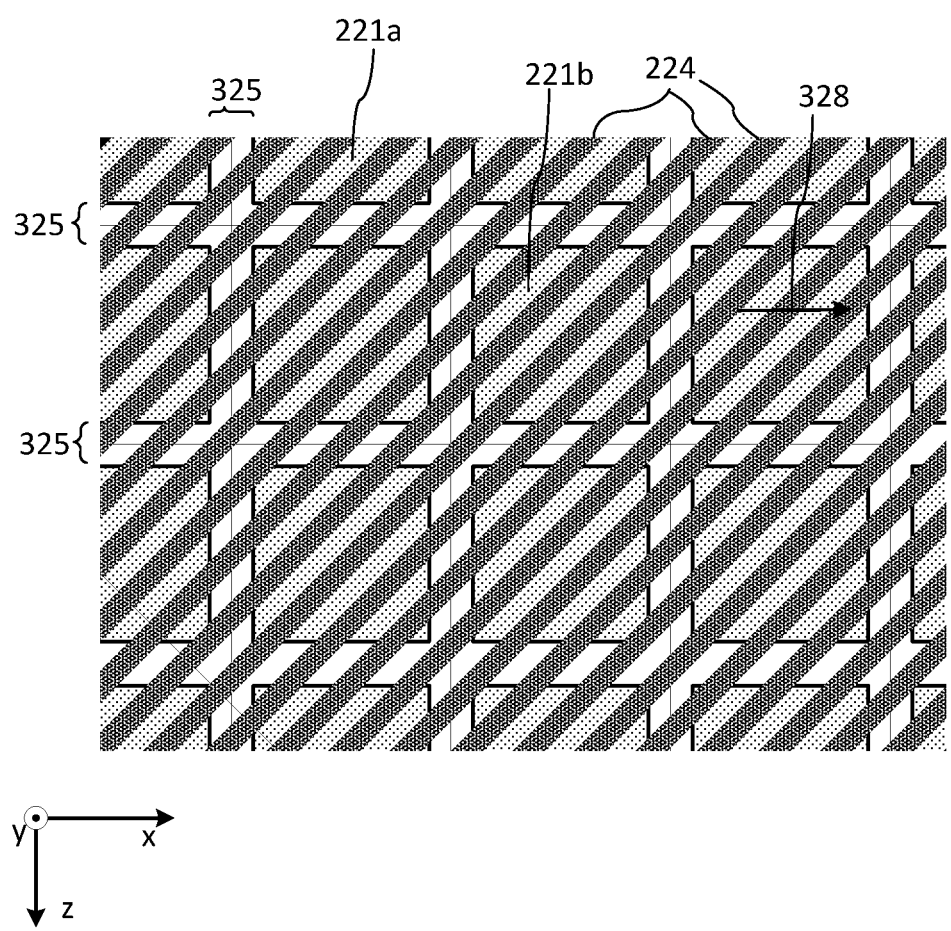
FIG. 4 is a top view of an embodiment of the LC device of FIG. 3 having grating lines extending over multiple pixel electrodes.

Referring now to FIGS. 3 and 4, there is illustrated a side cross-sectional view of a liquid crystal (LC) device 200 containing therewithin a reflective FB waveplate 220 of the type illustrated in FIG. 2. The LC device 200 includes a substrate or wafer 202, and a first electrode 221 formed in or upon the substrate 202, with the first electrode 221 having a reflective top surface 225. In a preferred embodiment the reflective top surface 225 of the first electrode 221 is substantially flat on a scale of the grating pitch, although embodiments may be envisioned when it is not the case. A separation layer 222, which is substantially transparent at an operating wavelength λ of the LC device 200, is disposed over the flat reflective top surface 225 of the first electrode 221. It may be, for example, a layer of SiO2, or of any other suitable dielectric material as described hereinabove or hereinbelow. In one embodiment, the separation layer 222 is composed of an electrode passivation layer 232, which is also referred to herein as the electrode cap layer 232, and a spacing layer 242 as described more in detail hereinbelow. A partially reflective sub-wavelength grating 233, which may be mostly transmissive for a first linear polarization (TM) and mostly reflective for a second linear polarization (TE), is disposed over the separation layer 222. The partially reflective sub-wavelength grating 233 may be in the form of a metal grid that has parallel grating or grid lines 224 that extend in a selected direction along the flat reflective top surface 225 of the first electrode 221, at a pre-determined distance d therefrom as defined by the separation layer 222. In FIG. 3, the selected direction is the direction of a 'z'-axis orthogonal to the plane of the figure. In one embodiment, the partially reflective sub-wavelength metal grating 233 may incorporate, or be covered by, a grating cap layer 243, which may have a substantially flat top surface. The grating cap layer 234 may also be of silicon dioxide (SiO2), or it may be of any other suitable dielectric material as described hereinabove or hereinbelow. A liquid crystal (LC) layer 230 is disposed over the partially reflective sub-wavelength grating 233. The LC layer 230 has a predominant direction of orientation of the liquid crystal molecules, which is termed "director". In one embodiment, the director of the LC layer 230 is at an acute angle α to the grating lines 224, preferably but not necessarily at 45 degrees thereto. A second electrode 241, which is substantially transparent at the operating wavelength λ, is disposed over the LC layer 241 in opposition to the first electrode 221, so that in operation the LC layer 230 imparts a variable optical phase shift to light 101 impinging on the second electrode 241 when a voltage V is applied between the first electrode 221 and the second electrodes 241. Accordingly, the LC device 200 may also be referred to herein as the variable optical retarder.

The partially reflective sub-wavelength grating 233 may be in the form of a sub-wavelength metal grating that is substantially similar to the sub-wavelength metal grating 133 described hereinabove with reference to FIG. 2. Grating lines 224 of the sub-wavelength metal grating 233 may be in the form of metal strips of a thickness t and a width a separated from each other by grating openings 234 having a width b, with the grating pitch p=(a+b) and the dielectric fill factor f=b/p. The metal of the metal strips 234 may be, for example, Aluminum (Al). It can also be any other suitable metal, such as for example gold (Au), silver (Ag) or copper (Cu), or their alloys. The metal grating 233 may also be referred to herein as the thin-film metal grating similarly to the metal grating 133; it forms with the reflective face 225 of the first electrode 221 a reflective FB waveplate 220 that is substantially similar in structure and principles of operation to the FB WP 120 described hereinabove with reference to FIG. 2. In particular, the incident light beam 101 acquires upon reflection from the FB WP 220 an optical phase shift φ that is different for the TE and TM polarizations, i.e. for light with the electric field directed along the grating lines 224 (TE polarization) and perpendicular thereto (TM polarization). The difference between these TE and TM phase shifts defines the retardance of the WP 220. In contrast to the variable retardance which may be imparted upon the optical beam 101 by the LC layer 230, the retardance of the FB WP 220 is fixed by the selected materials and the geometry of the structure, e.g. the refractive indices of the separation and capping layers 222, 243, grating geometry parameters t, a and f, the thickness d of the separation layer 222 and, possibly, on the conductance of the metal of the grating strips 224.

It will be appreciated that although in FIG. 3 the metal grating 233 is shown to be periodic, the periodicity of the grating is not a requirement, and the grating may be aperiodic in some embodiments, provided that it imparts, in reflection, a desired phase difference between the TE and TM polarization of incident light, so as to provide a desired waveplate retardance. The maximum value of the grating pitch in such aperiodic gratings should preferably be selected sufficiently small compared to the operating wavelength λ so as to ensure the absence of non-zero diffraction orders from the grating.

In one embodiment, the fill-factor f of the grating 233 and the thickness d of the separation layer 222 that separates the metal grating 233 from the reflective top surface 225 of the first electrode 221 are selected to provide, substantially, a quarter wave plate (λ\4) one-way retardance to the incident optical beam 101 at the operating wavelength λ, which amounts to a substantially half wave plate (λ/2) two-way retardance of the reflective WP 222. In one embodiment, the two-way retardance of the reflective WP 220 at an operating wavelength λ may be within a λ\2±20% range.

By way of example, in one embodiment wherein the operating wavelength λ of the LC device 200 lies in the telecommunications C-band at about 1.55 micrometers (μm), the thin-film metal grating 233 has a pitch p in the range of 0.6 to 1.0 μm, and the thin-film metal strips 224 each have a width a in the range of 0.2 to 0.4 μm and a thickness t in the range of 0.03 to 0.07 μm. Further by way of example, the separation layer 222 has an optical thickness in the range of 0.22·λ to 0.3·λ, or in the range of 0.34 to 0.47μ for λ=1.55 μm. Further by way of example, in one embodiment wherein the separation layer 222 and the grating cap layer 243 are both made of fused silica (SiO2) having the refractive index n≅1.44, the thin-film metal grating 233 is made of an Aluminum film and has a pitch p of 0.8 μm, the metal strips 224 each have a width a of about 0.264+\−0.04 μm and a thickness t of about 0.04+\−0.004 μm, with the openings between the metal strips 224 each having a width b of about 0.536+\−0.04 μm, and the separation layer 222 has a thickness of 0.25+\−0.025 μm. The grating cap layer has a thickness that is somewhat greater than that of the metal strips, for example in the range of about 0.06 to 0.12 μm, for example about 0.09 μm. Of course, other combinations of the WP parameters t, p, a, f and d that provide a desired value of the waveplate retardance may be used in other embodiments.

In operation, an optical beam 101 incident upon the device propagates in succession through the second transparent electrode 241 and the liquid crystal layer 230, and impinges upon the sub-wavelength grating 233. The sub-wavelength grating 233 and the reflective top surface 225 of the first electrode 221 cooperate to reflect back the light 101 incident thereon to propagate through the LC layer 230 a second time. The voltage V is applied between the first electrode 221 and the second electrode 241, thereby varying the optical retardance of the liquid crystal layer 230. As a result, a variable phase delay is imparted to the optical beam 101. With suitably selected parameters a, b, t and d of the reflective WP structure 220, the sub-wavelength grating 233 and the reflective top surface 225 of the first electrode 221 together may act, in reflectance, as a half-wave plate oriented at α=45 degrees to the LC director 328 illustrated in FIG. 4, switching TE and TM polarizations of the incident light 101 as known in the art for half-wave plates. This switching results in lessening the sensitivity of the LC device 200 to a state of polarization of the optical beam 101, since each of the TE polarized and TM polarized components of the incident beam 101 propagate through the LC layer 230 one time as TE light and one time as TM light. In some embodiments, the angle α is not equal to 45 degrees, but remains an acute angle. The retardation value of the reflective FB WP 220 may deviate from a quarter-wave in a single pass, if some degree of polarization dependence is required.

Referring again to FIG. 3, in the shown embodiment the electrode 221 is comprised of a plurality of pixel electrodes, which are represented in the FIG. 3 by two pixel electrodes 221a and 221b, and are also indicated in FIG. 4 in a plan view. These pixel electrodes are independently addressable using electrical circuitry provided within a holding substrate 211. By applying different voltages between the second electrode 241 and each of the pixel electrodes 221a and 221b, the LC device 200 may impart an optical phase shift that varies across the wavefront of the optical beam 101 in a substantially polarization-independent manner, thereby acting as a variable phase array device.

FIG. 4 illustrates, in a 'top' plan view, an embodiment of the LC device 200 wherein these pixel electrodes have a generally square shape and are separated by inter-pixel electrode gaps 325 isolating them electrically from each other. The director of the overlaying LC layer is schematically shown by an arrow 328, and in this embodiment is oriented at α=45° to the thin-film metal strips 224. This orientation of the grating strips ensures that a phase shift imparted by the LC layer 230 to one polarization of incident light on the first pass therethrough is equally applied to the orthogonal polarization on the second pass of the LC layer 230 upon reflection of the light from the WP 220. In other embodiments, the angle α between the LC director 328 and the grating strips 224 may differ from 45°, and may also differ from pixel to pixel. The desired orientation of the LC director 328 may be ensured, for example, by using LC alignment layers (not shown in FIG. 3) sandwiching the LC layer as known in the art. It will also be appreciated that the pixel electrodes 221 may have a non-square shape.

It is to be understood that, although FIGS. 3 and 4 show a plurality of pixel electrodes 221 under the common liquid crystal layer 230, the sub-wavelength metal grating 233, and the second or backplane electrode 241, the LC device 200 can include only one pixel electrode 221, effectively making the LC device 200 a non-pixilated variable optical retarder, which can be used in applications where the entire optical beam 101 needs to be given a same variable optical phase shift.

Figure 5:
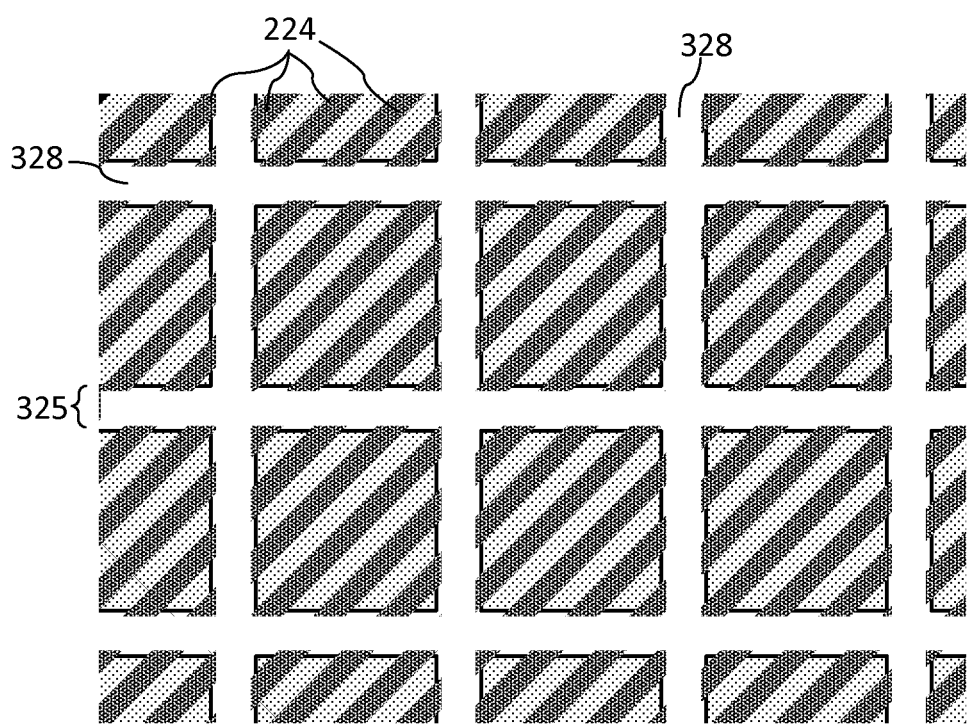
FIG. 5 is a top view of an embodiment of the LC device of FIG. 3 having gaps in grating lines between adjacent pixel electrodes.

Referring now to FIG. 5, in one embodiment the metal strips 224 do not continue uninterrupted over adjacent pixel electrodes, but include grating gaps 328 above the electrode gaps 325. These grating gaps 328, which may also be referred to as "pixel fences", separate portions of the metal strips 224 located above one pixel electrode from portions of the metal strips 224 located directly above an adjacent pixel electrode, thereby dividing the thin-film metal grating 233 into a plurality of separate pixel gratings that are electrically isolated from each other. The grating gaps or openings 328 lessen an undesirable pixel-to-pixel electrical cross-talk that may arise from a capacitive coupling between adjacent pixels through the thin-film metal grating 233 in embodiments wherein the metal strips 224 continuously extend over two or more pixels, as illustrated in FIG. 4.

Figure 6:
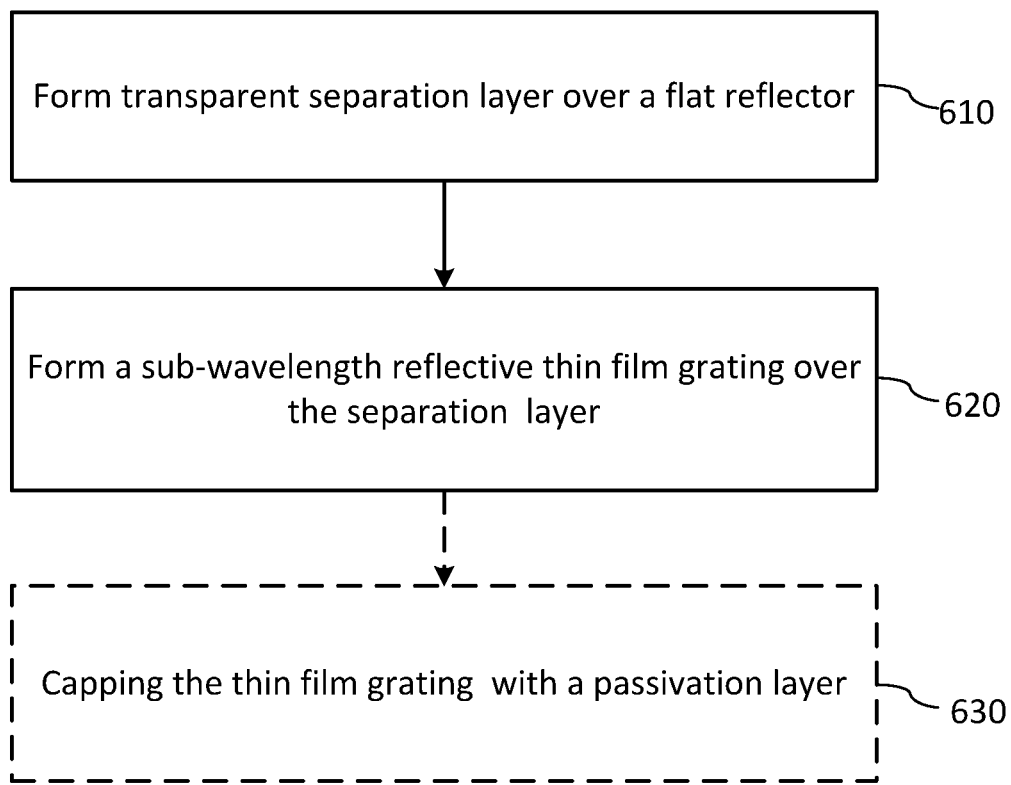
FIG. 6 is a flowchart of a method for fabricating a reflective FB waveplate using a flat reflector.

Advantageously, the incorporation of the thin-film metal grating 233 in the LC device 200 enables forming, within the LC device 200, a polarization-equalizing half-waveplate that is relatively thin, and thereby does not significantly increase the operating voltage, and does not require any changes to the 'bottom' first electrode 221. As illustrated in FIG. 6, a method to provide such a reflective FB waveplate of any desired retardance may be described as involving the following general steps or operations: a) forming a transparent dielectric separation layer over a flat reflector at 610, and b) forming a sub-wavelength thin-film metal grating over the separation layer at 620. Step or operation 620 may be optionally followed by a step or operation 630 of capping the sub-wavelength metal grating with a grating passivation layer, so as to protect the metal grating from environment and, possibly, from subsequent processing steps.

The method outlined hereinabove with reference to FIG. 6 may be conveniently used in LCoS (liquid-crystal-on-silicon) devices fabricated using a conventional CMOS technology with at most minor non-disruptive changes thereto. In particular, the final "top" layer of a standard LCoS CMOS wafers is typically a planarized passivation layer of a dielectric material such as, for example, silicon dioxide ($SiO_2$). In LCOS devices wherein the electrode underneath an LC layer has a corrugated top surface as illustrated in FIG. 1B, such as for example the LCoS device described in U.S. Patent Document No. 2013/0070326 that is incorporated herein by reference, this electrode passivation layer has to be removed to form the desired meander relief of the electrode, e.g. by etching sub-micron grooves of a carefully selected depth into the metal of the top electrode of the CMOS wafer. In contrast, the separation of the 'top' and 'bottom' reflective surfaces 225, 227 in the FB WP 220 advantageously enables avoiding etching grating lines into the surface of the reflective metal layer 221, thereby avoiding the use of timed etching and possible wafer yield issues due to etch depth errors. Furthermore, step 610 of the method outline hereinabove with reference to FIG. 6 may be performed so as to incorporate the electrode passivation layer at the top of the LCoS CMOS wafer, which in this case embodies the flat reflector of 610, into the grating separation layer.

Referring back to FIG. 3, one embodiment of the LC device 200 employs a conventional LCoS CMOS wafer having a passivated flat metal electrode 211/232 at the top, substantially without modifications of its constituent layers, as the substrate 202. The top passivation layer 232 of the LCoS wafer 202 may in this embodiment be incorporated in the LC device 200 as a part of the separation layer 222 of the reflective waveplate 220. Thus, in this embodiment the as-deposited LCoS CMOS fabricated passivation layer 232, which is also referred herein as the electrode passivation layer or as the electrode cap layer, does not need to be removed to fabricate the reflective FB waveplate 220; instead, the spacer layer 242 of a suitable material may be disposed directly over the electrode cap layer 232 so as to provide the separation layer 242 having the thickness d corresponding to the desired value of the fixed wave plate retardance, such as the half-wave retardance of λ/2. Advantageously, LCoS fabrication facilities other than the LCOS CMOS fabrication facility that produced the CMOS wafer 202 can be employed, if so desired, to fabricate the FB waveplate 220.

The electrode cap layer 232 is typically a layer of silicon dioxide (SiO2), but may be of any suitable transparent dielectric material as known in the art, such as but not exclusively a layer of Silicon Nitride (Si3N4), Aluminum Oxide (Al2O3), Titanium Oxide (TiO2), Tantalum Pentoxide (Ta2O5), or Hafnium Oxide (HfO2). The material of the spacer layer 242 may also be selected from the same group of transparent dielectric materials, and may be a layer of the same or matching material as the electrode cap layer 242; for example, they both may be layers of SiO2. The metal strips 224 may be made, for example, of thin-film aluminum (Al), or of any suitable metal, including but not limited to gold (Au), silver (Si), and copper (Cu).

Figure 7:
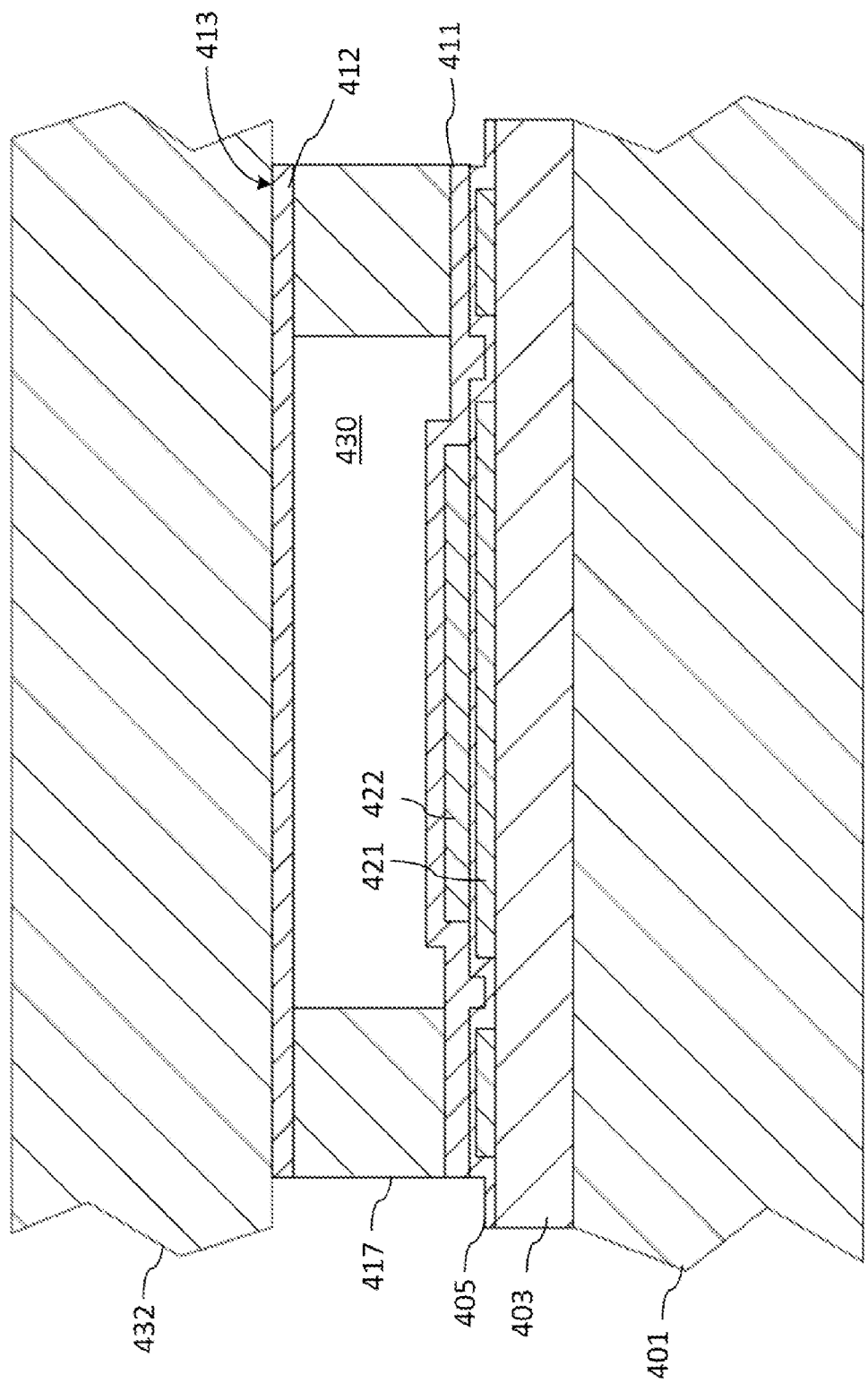
FIG. 7 is a side cross-sectional view of one cell of an LC device incorporating a reflective FB waveplate formed over a flat LCoS substrate.

Referring now to FIG. 7, there is illustrated a cross-sectional view of one cell of an exemplary embodiment or a variation of the LC device 200, which may be fabricated using conventional CMOS LCOS techniques and processes. It includes a silicon (Si) or silicon dioxide (SiO2) substrate 401 incorporating an LCoS electronic circuitry layer 403. Reflective pixel electrodes 421 are disposed on top of the substrate and over the LCoS electronic circuitry layer 403, with a CMOS-fabricated electrode passivation layer 405 covering the pixel electrodes 421 to protect them from the environment and from subsequent processing steps. An FB WP layer structure 422 is disposed over the electrode passivation layer 405 and includes a spacer layer of a dielectric material followed by a metal grating formed of parallel spaced apart metal strips and a grating cap layer, such as the spacer layer 242, the thin-film metal grating 233, and the grating cap layer 234 described hereinabove with reference to FIG. 3. The grating cap layer 234 (not shown separately in FIG. 6) serves to planarize the top surface to the FB WP layer 422, and to protect the thin-film metal grating from subsequent processing steps, such as alignment layer brushing. Alignment layers 411 and 412 adhered to the grating cap layer of the FB WP layer structure 422 and the second electrode 413 are used to align liquid crystal molecules in an LC layer 430 in a desired direction. The alignment layers 411, 412 may be, for example, polymer layers, for example of polyimide, with surfaces facing the LC layer 430 suitably rubbed or brushed, as known in the art. The second, or backplane, electrode 412 is transparent at the operating wavelength of the device and may be in the form of a suitable electrically conducting coating, for example made of Indium Tin Oxide (ITO), disposed on a glass cover plate 432, which protects the LC layer 430 from the top while allowing light incident thereon to propagate through the LC layer 430 and back. The LC layer 430 is protected on the sides by an LC cell gasket 417.

Speed and compactness of LCoS technology has resulted in its successful use in spatial light modulators for high-definition optical projector equipment. According to one aspect of the present disclosure, FB waveplates incorporating sub-wavelength metal gratings 133 or 233 disposed over a flat pixelated or non-pixelated electrode at a pre-determined distance therefrom can be used in a LCoS-based spatial light modulator as a trim retarder. Trim retarders provide a relatively small birefringence which, in combination with the voltage-controlled birefringence of the liquid crystal layer of a LCoS spatial light modulator, provides a wider viewing angle and improves image contrast.

Figure 8:
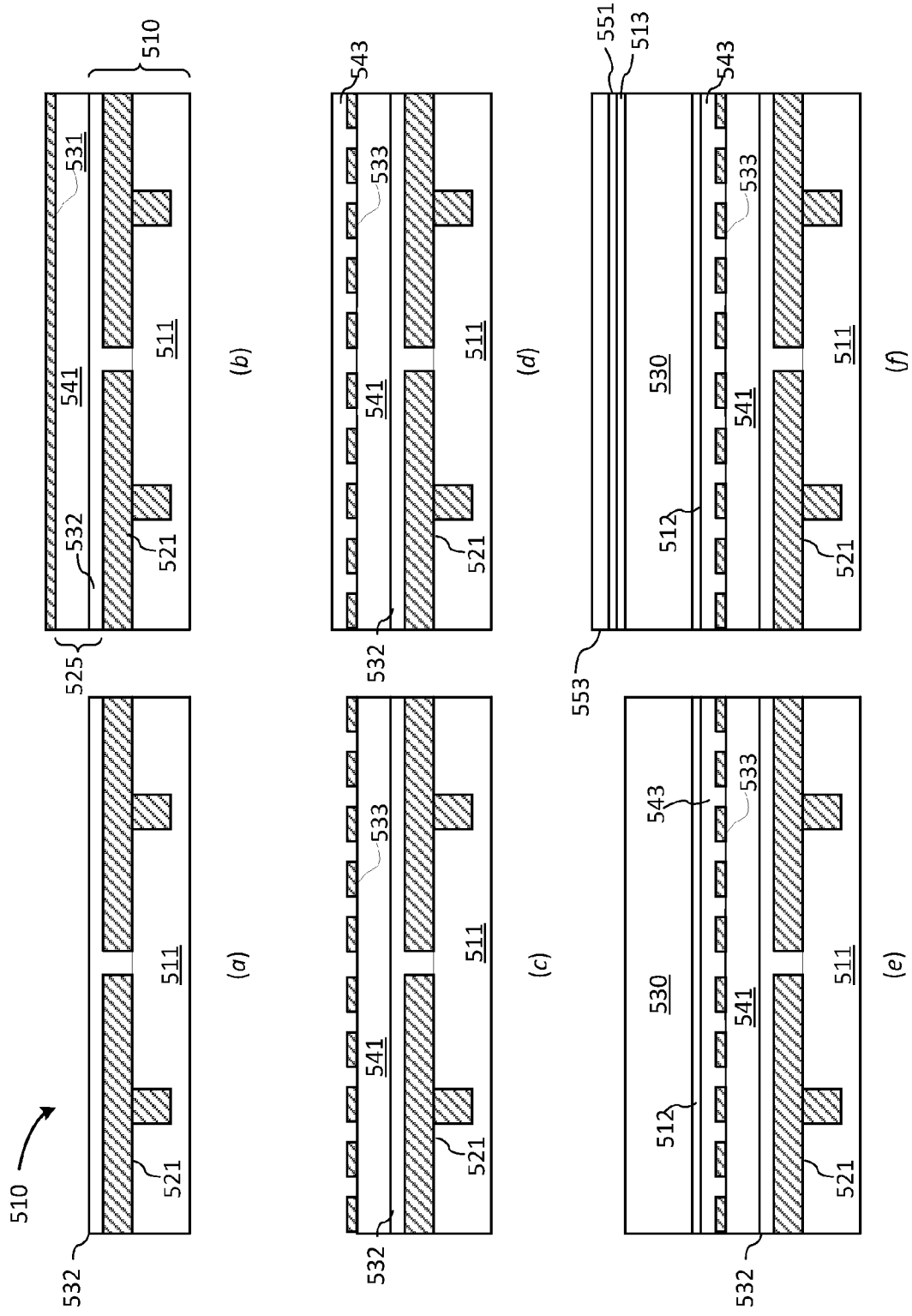
FIG. 8 is a schematic diagram illustrating side cross-sectional view of an LC device at various steps of an exemplary manufacturing process.
Figure 9:
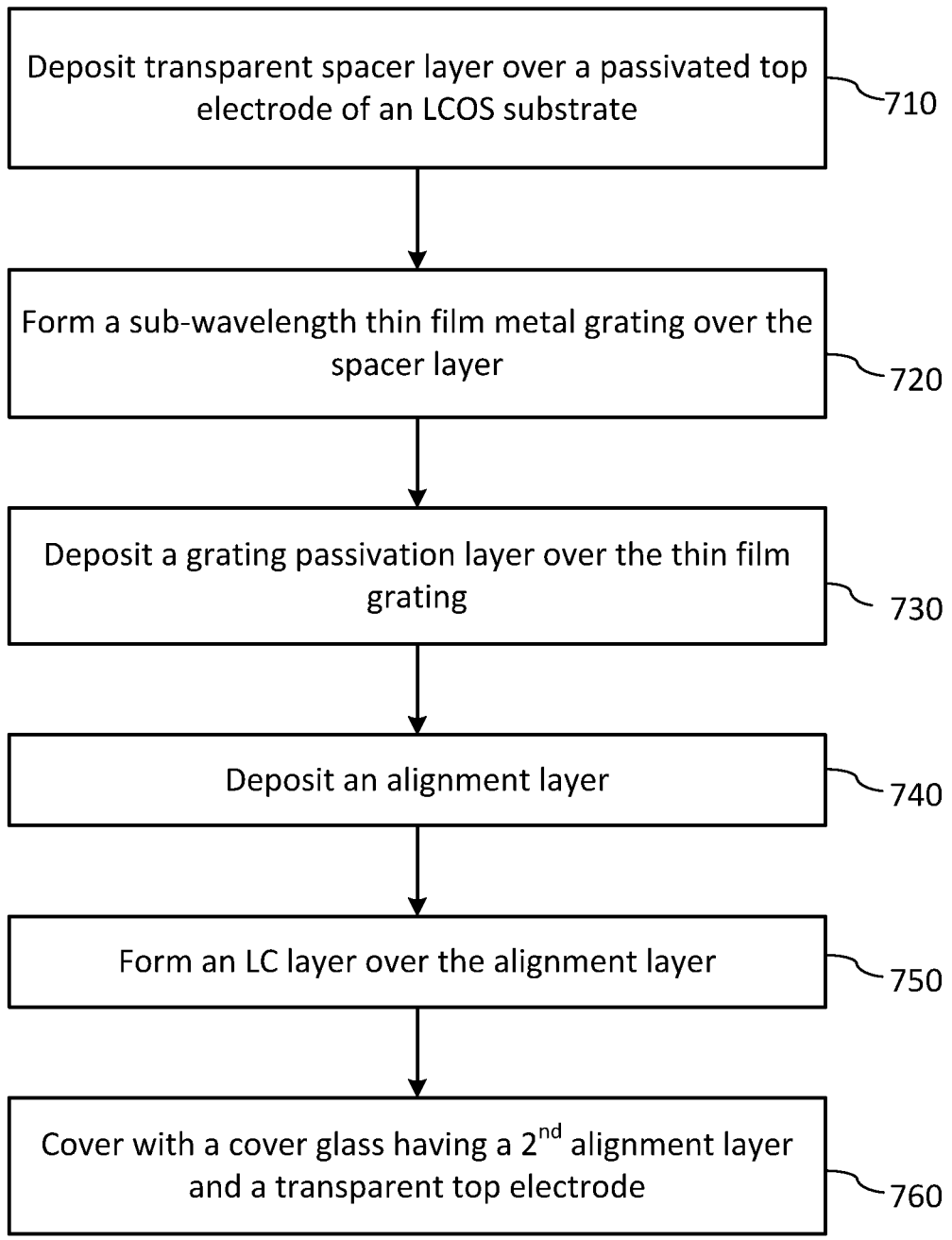
FIG. 9 is a flow chart of an exemplary method for manufacturing the LC device of FIG. 8 in one embodiment thereof.

Turning now to FIGS. 8 and 9, an exemplary method for fabricating an LC device of the type illustrated in FIG. 3-4, 5 or 7 may include the following steps or operations, which may be performed using conventional CMOS and LCoS technologies and processes. As illustrated, the method may start at step 710, wherein a transparent spacer layer 541 is deposited over an LCoS substrate 510 having a first electrode 521 passivated with a passivation layer 532 on top. The wafer 510 may be a conventional CMOS LCoS wafer formed with a silicon or silicon dioxide substrate 511 topped with the passivated electrode 521/532, see panel (a) of FIG. 8. The first electrode 521 may or may not be pixelated. In one embodiment, the spacer layer 541 may be of a dielectric material matching that of the electrode passivation layer 532. For example, both layers may be of SiO2. Alternatively, the spacer layer 541 may contain SiO2, Si3N4, Al2O3, TiO2, Ta2O5, or HfO2. It will be appreciated that this list of materials is not exclusive and the material of the spacer layer may be any suitable non-conducting transparent material which can be made to adhere to the electrode cap layer 532.

The spacer layer 541 may be deposited using any suitable deposition method known in the art, such as but not exclusively CVD deposition, PECVD deposition, Ion assisted deposition, and ion beam sputtering. In one embodiment, the spacer layer 541 is deposited up to a thickness that, together with the electrode passivation layer 532, provides a separation layer 525 of a desired optical thickness that may be selected based on a target waveplate retardance. Accordingly, step 710 may include obtaining a thickness value for the electrode passivation layer 532, for example by measurement or based on a specification datasheet for the LCoS substrate 510, and determining the target thickness of the spacer layer 541 based on the thickness of the electrode passivation layer 532 and a target value of the WP retardance.

At step 720, a sub-wavelength partially reflective metal grating or grid 533 is formed upon the spacer layer 541, resulting in a structure illustrated at panel (c) of FIG. 8. The metal grating 533 may be generally as described hereinabove with reference to the metal gratings 133 or 233 of FIGS. 2-5, and may be comprised of a plurality of parallel thin-film metal strips. Those skilled in the art will appreciate that the fabrication of the grating 533 may be performed using a variety of techniques. For example, it may be fabricated using a lift-off process, wherein the top surface of the spacer 541 is first patterned with a photoresist, with openings in the photoresist pattern where the metal strips of the grating are to be located. A thin metal film is then deposited over the patterned spacer 541, followed by a removal of the photoresist with the portions of the metal film over it. In another approach, a thin metal film 531 is deposited upon the surface of the spacer 541 as illustrated in a panel (b) of FIG. 8, and the thin metal film 531 is then patterned, for example using photolithography, to form the metal strips of the grating 533 with openings therebetween. The thin metal film 531 may be, for example, an Al film having a thickness in the range of about 0.03-0.07 μm, with the width of the metal strips of the grating being in the range of 0.2 to 0.4 μm for an exemplary grating pitch of about 0.7 to 0.9 μm.

Note that the grating pitch of the sub-wavelength metal grating 533 of FIG. 8, as well as that of the similar gratings 133 and 233 of FIGS. 2 and 3, may be reduced to values substantially smaller than λ/2, with the width of the grating strips scaling down approximately proportionally to the pitch. However, this reduction of the feature size of the metal grating 533 may require the use of more sophisticated and expensive technologies resulting in an undesirable increase in manufacturing costs. Advantageously, we found that having the pitch of the metal gratings 533, 233 or 133 on the order of 0.5λ–0.6λ provides good FB waveplate performance while enabling the use of conventional, relatively low-cost LCoS fabrication technologies.

In other embodiments, the metal grating 533 may be a thin-film grating made of other suitable metals such as but not exclusively of Au, Ag, and Cu. In one embodiment, portions of the metal film 531 forming the grating lines of the grating 533 may be removed over the inter-pixel gaps as described hereinabove with reference to FIG. 5. This way, portions of the grating 533 directly above individual pixel electrodes 521 are electrically isolated from their nearest neighbors in order to lessen capacitive coupling between adjacent pixels, so that spatially varying voltages can be applied across the LC layer of the finished device.

At step 730, a grating passivation layer 543 is deposited over the thin-film metal grating 533 using a suitable deposition technique known in the art, in order to protect it from damage during consecutive processing steps, and to planarize the surface of the wafer; this step results in a structure illustrated at panel (d) of FIG. 8. The material of the grating passivation layer 543, which is also referred to as the grating cap layer, may be for example SiO2, or it may be another suitable non-conducting transparent material such as but not exclusively Si3N4, Al2O3, TiO2, Ta2O5, or HfO2. This is followed by depositing an LC alignment layer 512 at step 740, and an LC layer 530 at step 750, which results in a structure illustrated at panel (e) of FIG. 8. The LC alignment layer 512 may be, for example a layer of a polymer material such as polyimide, which may be rubbed or brushed in a direction of a desired orientation of the LC director prior to the deposition of the LC layer 530. Finally, the LC layer is covered with a cover glass 553 having a transparent electrode layer 551 and a second LC alignment layer 513 deposited on a side thereof facing the LC layer 503, as illustrated at panel (f) of FIG. 8 and as generally known in the art. Note that steps 740, 750, 760 may be as conventionally performed in the art of LCoS device manufacturing and will not be described herein in further detail.

The above-described exemplary embodiments are intended to be illustrative in all respects, rather than restrictive, of the present disclosure. For example, although the exemplary embodiments were described hereinabove with reference to LC devices such as variable optical retarders, it will be appreciated that the FB waveplates of the type described hereinabove may also be used in other applications, and in particular in optical devices manufactured using LCoS and CMOS technologies. In another example, in multi-pixel devices only a fraction of the pixels may include the FB WP structures based on sub-wavelength thin-film metal grating as described hereinabove, while the gratings may be either absent in other pixels of the device, or may be designed to have a different retardance. Furthermore, each of the exemplary embodiments described hereinabove may utilize features that were described herein with reference to other embodiments. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A liquid crystal (LC) device comprising:
a first electrode having a reflective top surface;
a separation layer disposed over the reflective top surface of the first electrode and between the first electrode and a sub-wavelength metal grating, wherein
the separation layer is substantially transparent at an operating wavelength of the LC device and
the sub-wavelength metal grating is disposed over the separation layer, the sub-wavelength metal grating comprising a plurality of parallel metal strips spaced apart from each other and extending along the reflective top surface of the first electrode at a predetermined distance therefrom defined by the separation layer so as to form a reflective form-birefringent (FB) waveplate with the reflective top surface of the first electrode;
an LC layer disposed over the sub-wavelength metal grating; and
a second electrode disposed over the LC layer in opposition to the first electrode, wherein the second electrode is transparent at the operating wavelength so that the LC layer imparts a variable optical phase shift to light impinging on the second electrode when a voltage is applied between the first and second electrodes.

2. The LC device of claim 1, further comprising:
a grating cap layer, disposed over the plurality of parallel metal strips, for providing a flat surface for the LC layer.

3. The LC device of claim 2, wherein the grating cap layer comprises a dielectric material that extends into gaps between the plurality of parallel metal strips.

4. The LC device of claim 1, wherein the plurality of parallel metal strips comprise thin film metal strips that are thinner than the separation layer.

5. The LC device of claim 1, wherein the separation layer has a thickness providing a target optical retardance for light impinging upon the sub-wavelength metal grating from the second electrode.

6. The LC device of claim 1, wherein the separation layer has an optical thickness of substantially a quarter of the operating wavelength.

7. The LC device of claim 1, wherein the separation layer has an optical thickness in a range of $0.22*\lambda$ to $0.3*\lambda$, wherein $\lambda$ is the operating wavelength.

8. The LC device of claim 1, wherein the sub-wavelength metal grating has a pitch in a range of 0.6 to 1.0 μm, and the plurality of parallel metal strips each have a width in a range of 0.2 to 0.4 μm and a thickness in a range of 0.03 to 0.07 μm.

9. The LC device of claim 1, wherein the separation layer comprises an electrode passivation layer disposed over the first electrode and a spacer layer disposed over the electrode passivation layer.

10. The LC device of claim 1, wherein a director of the LC layer forms an acute angle with the plurality of parallel metal strips.

11. The LC device of claim 1, wherein the first electrode comprises a plurality of individually addressable pixel electrodes separated by electrode gaps.

12. The LC device of claim 11, further comprising:
a substrate supporting the first electrode, wherein the substrate comprises circuitry for independently applying a voltage to each of the plurality of individually addressable pixel electrodes, and wherein the plurality of parallel metal strips have gaps located above the electrode gaps so as to electrically separate portions of the sub-wavelength metal grating located above adjacent pixel electrodes of the plurality of individually addressable pixel electrodes.

* * * * *